April 30, 1968 R. H. BRADLEY 3,380,288
ROLLING CONTACT TEST MACHINE
Filed Sept. 17, 1965 3 Sheets-Sheet 1
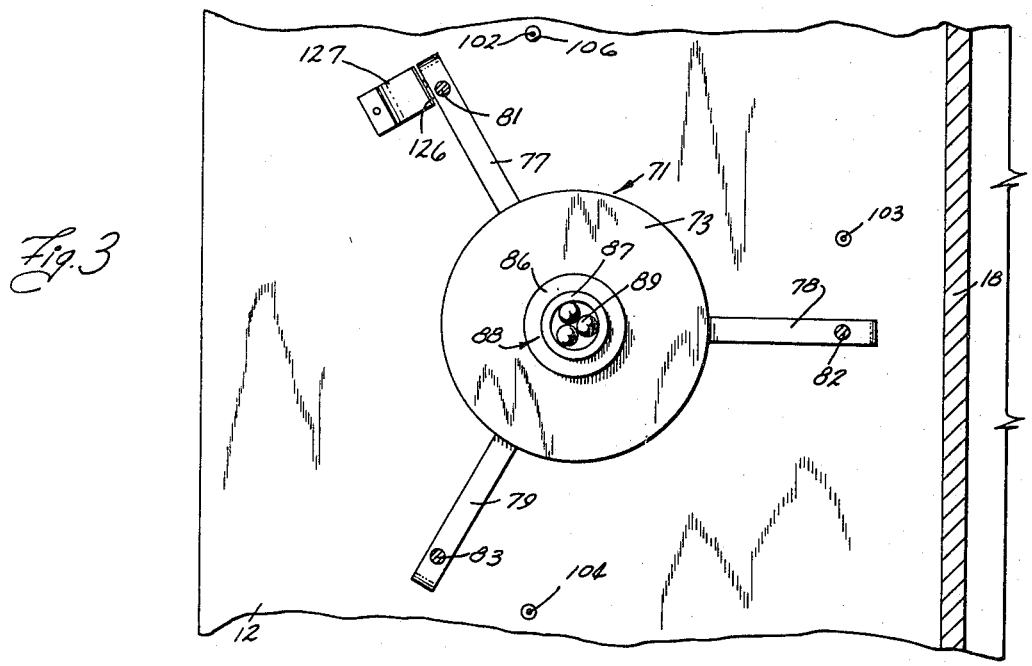
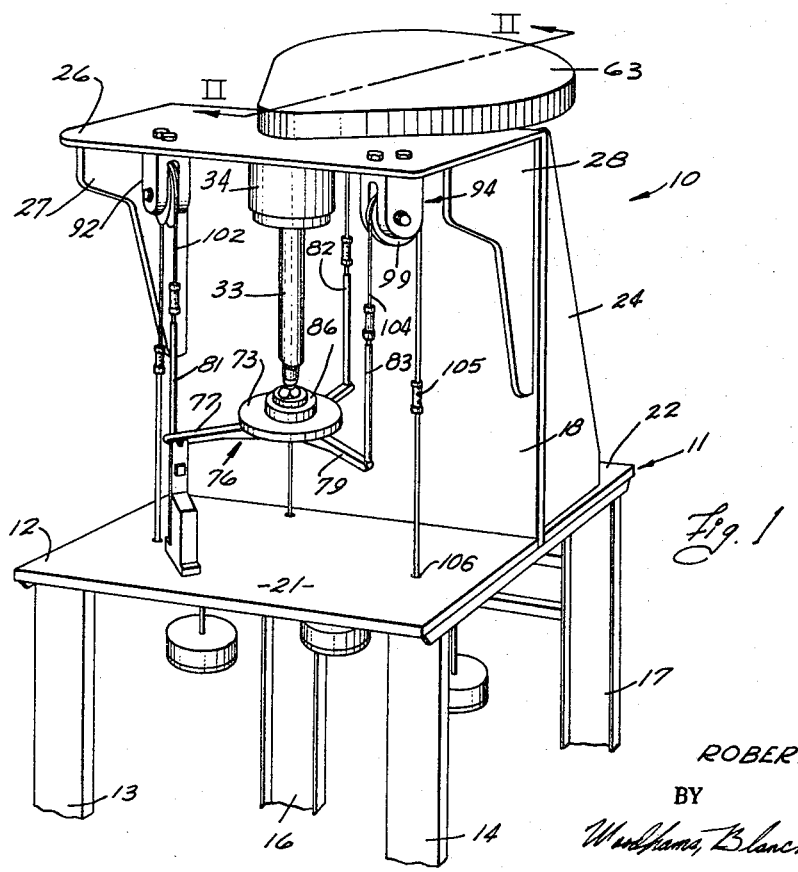
INVENTOR.
ROBERT H. BRADLEY
BY
Wardhams, Blanchard & Flynn
ATTORNEYS

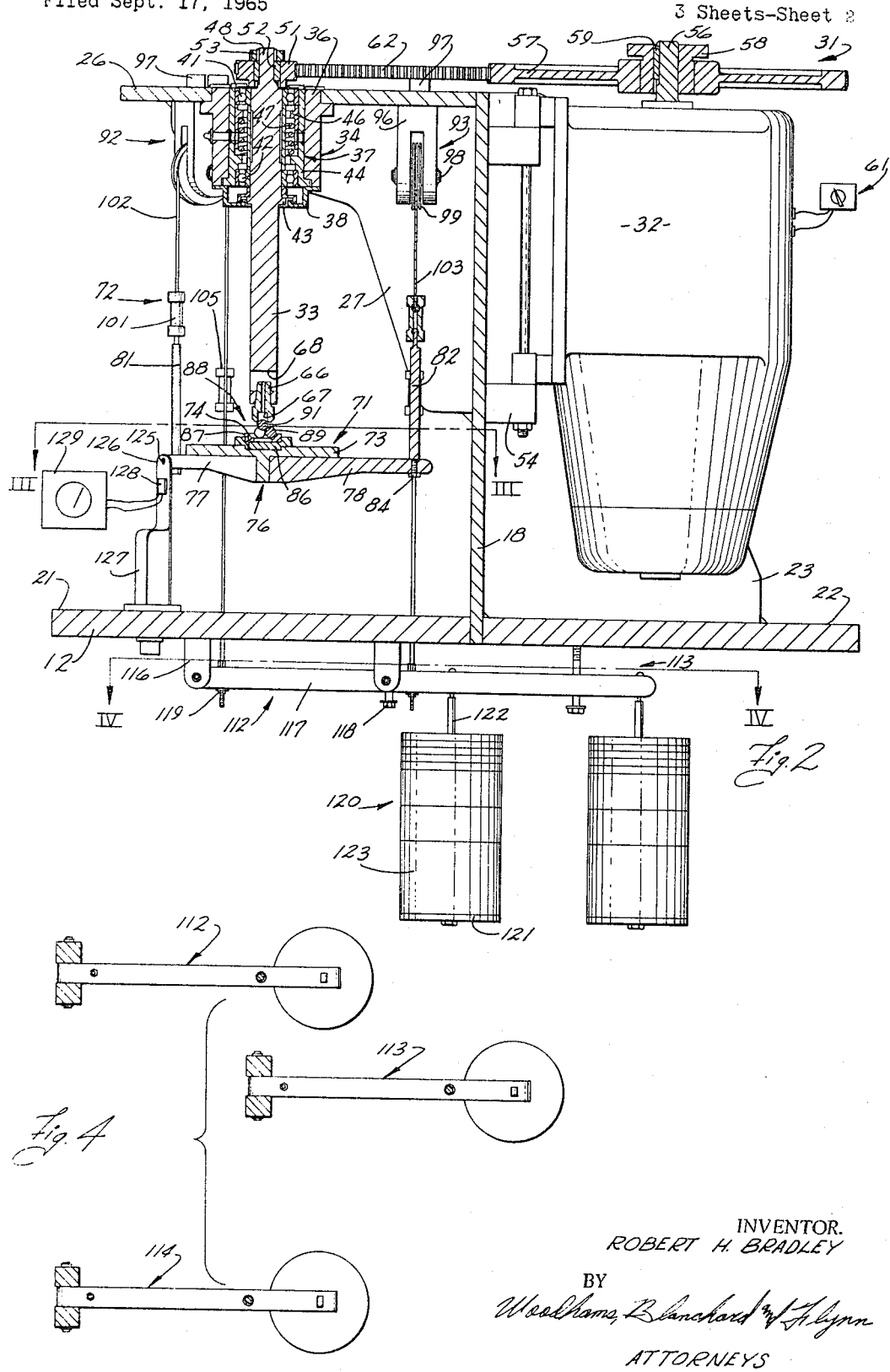

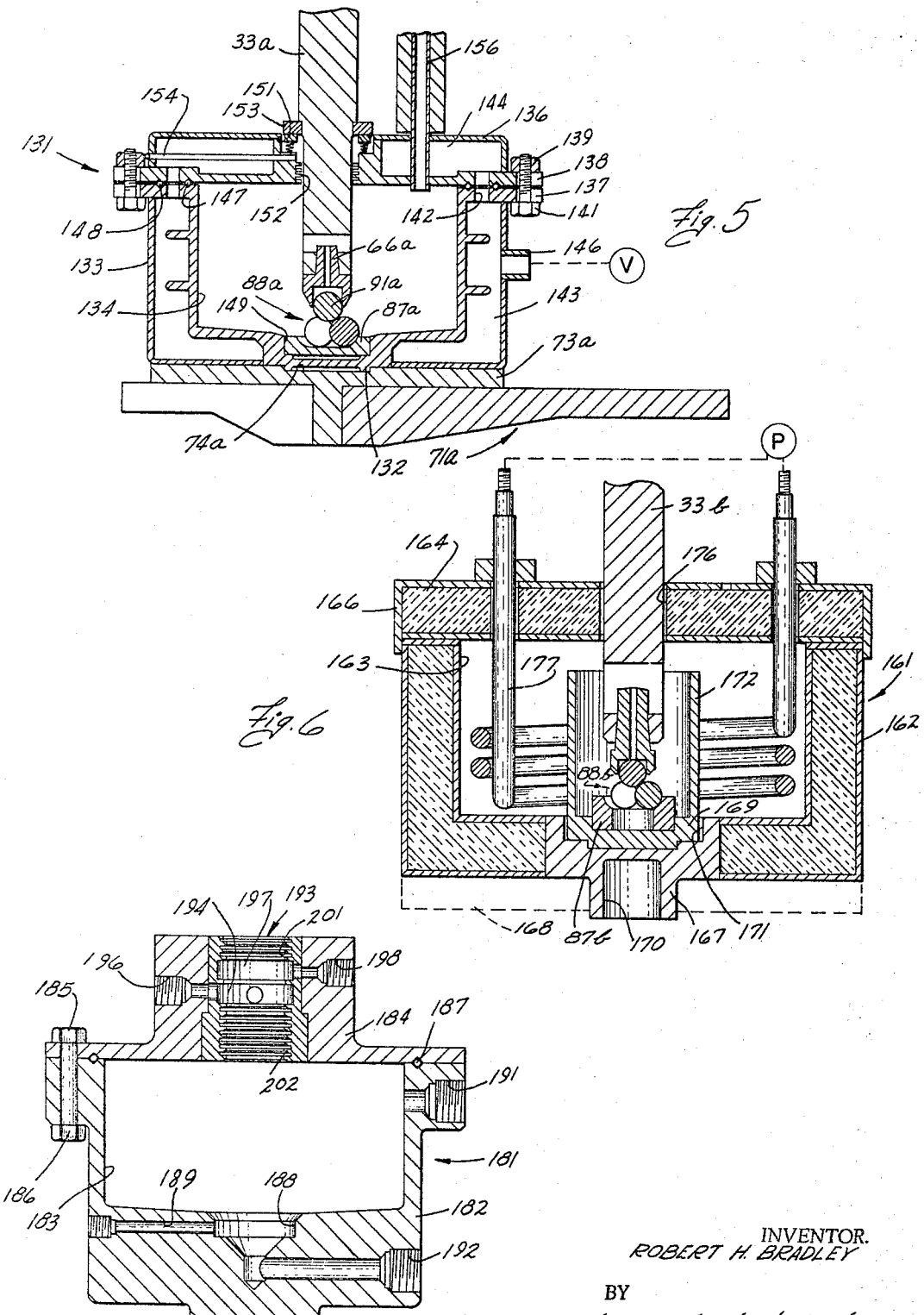

United States Patent Office 3,380,288
Patented Apr. 30, 1968

3,380,288
ROLLING CONTACT TEST MACHINE
Robert H. Bradley, Garden Grove, Calif., assignor to Industrial Tectonics, Inc., Ann Arbor, Mich., a corporation of Michigan
Filed Sept. 17, 1965, Ser. No. 488,029
14 Claims. (Cl. 73—9)

ABSTRACT OF THE DISCLOSURE

A rolling contact test machine for testing a multiball specimen including platform suspended by plural flexible elements beneath a rotatable drive spindle. The multiball specimen is supported on the platform opposite the end of the spindle. The flexible elements are led over pulleys and are provided with weights for urging the specimen with a preselected force against the end of the drive spindle while allowing the specimen to orient itself with respect to the spindle for uniform loading of the balls of the specimen. Test chambers are supportable on the platform for housing the specimen and spindle end in controlled environments including cryogenic, high temperature and pressurizable environments.

---

This invention relates to a rolling contact test machine and more particularly relates to a multiball test machine having a self-leveling and self-centering specimen platform suspension.

The testing and selection of rolling element bearing materials and lubricants particularly for the variety of environmental conditions encountered in the aerospace, nuclear and certain industrial fields where bearings must be tailored to specific applications is extremely time consuming and costly, particularly if the tests are conducted with complete bearing constructions. Moreover, materials evaluation in complete bearings is complicated by the interrelation of the many variables in a bearing operating in an unknown environment, which can influence the test results and limit the reliability of data produced.

A number of prior devices have been employed in the bearing industry and in research organizations to evaluate rolling element bearing materials, lubricants and so forth without the use of complete bearings. One of the most widely used types of prior device is a modification of the Shell four-ball machine. Such prior modified machines generally utilize a test specimen including a drive ball held and rotated against a plurality of intermediate balls, customarily three or sometimes four, which roll on an annular raceway located in a cup. Usually the cup is stationary and a thrust load is applied to the drive spindle for loading the test specimen. The rolling motion between the ball and raceway simulates the motion on the ball bearing. By varying ball size, spacing and race curvature of a variety of rolling contact conditions, simulating those which would exist in an actual ball bearing, can be investigated.

Although such previous machines have previously provided advantages over testing of complete bearings assemblies such previous machines have generally been designed for and limited to use in very specific individual investigations, such as for example, for studying the fatigue properties of materials operating under conventional environments and lubricated with grease or oil. These prior machines have usually been unuseable for other types of testing or, if useable at all, only with excessively costly and time consuming modifications.

Moreover, prior machines, of which I am aware, have been unsatisfactory in that they are susceptible to error as a result of misalignment of the driving spindle and test specimen. Heretofore it has been the custom to fix the rotational axis of the drive spindle with respect to the specimen supporting platform whereby the spindle and a specimen fixed to the platform may move only axially toward and away from each other for applying the load to the specimen. Thus, there has been a substantial problem in initially setting and subsequently maintaining the drive ball concentric with the driven ball set of the specimen without introducing sizeable differences in the instantaneous contact force exerted by the drive ball against each of the driven balls. Similarly, there has been the problem of initially obtaining and then maintaining parallelism of the axes of the spindle and the specimen without again introducing instantaneously unequal forces on the driven balls. Such uneven loading of the balls due to such eccentricity or cocking of the specimen with respect to the drive spindle may cause considerable test error and generally unsatisfactory test results.

Additional difficulties have been encountered in prior machines in which the specimen platform is rotatable for allowing measurement of the torque imposed upon the specimen by the drive spindle. Machines of this type of which I am aware have required slave bearings, usually rolling contact or fluid film (liquid or gas) bearings, and have thus been subject to problems of slave bearing operating capabilities and torque, particularly in unorthodox environments.

In addition, prior art machines of this type have commonly used loading systems for the specimen which are subject to variations in force over a period of time due, for example, to fatigue within the loading system, specimen wear or dimensional changes in the load path resulting from thermal cycling. Moreover, a given load force often cannot be precisely repeated from specimen to specimen and from test to test.

Hence, the objects of this invention include:

(1) To provide a rolling contact test machine of the multiball type having a self-leveling and self-centering specimen platform suspension which is capable of correcting for initially eccentric or cocked mounting of the specimen with respect to the drive spindle without exerting spurious forces of significant magnitude on the test specimen or drive spindle.

(2) To provide a machine, as aforesaid, capable of use with specimens of a widely varying nature, including both four and five ball test specimens, and specimens having widely varied or differing ball diameters, ball spacing, race curvature and so forth, without modification or, in most cases, adjustment of the basic machine.

(3) To provide a machine, as aforesaid, capable of exerting identical load forces on widely varying specimens, capable of precisely maintaining load forces for long test periods without adjustment despite specimen wear, dimensional changes in the load path due to thermal cycling and capable of precisely repeating or returning to a given load force on the same or different specimens.

(4) To provide a machine, as aforesaid, which includes a specimen platform urged toward the end of the drive spindle by a plurality of flexible elements which are in turn tensioned by weights to provide a precisely determinable loading force on the specimen.

(5) To provide a machine, as aforesaid, which can be used for a wide variety of tests including as particular examples, endurance studies of potential rolling element materials, wear rate of various combinations of materials, testing of dry film coatings, oils and greases, and separator materials evaluation.

(6) To provide a machine, as aforesaid, which can be used to test rolling element materials under wide variety of conditions including elevated temperatures, widely variable spindle speeds and load forces, pressurized fluid or gas environments, very low pressure or vacuum conditions, environments having widely varying chemical and physical properties such as storable propellants including fuels and oxidizers, highly corrosive fluids and liquid metals, demineralized water, inert gases, reducing atmospheres and cryogenic fluids and gases.

(7) To provide a machine, as aforesaid, in which the platform is supported for rotation through small angular deflections without the use of slave bearings or the like and in which a strain beam is used to restrain the platform from excessive torque induced rotation while furnishing a mount for conventional strain measuring means for measuring the torque exerted on the specimen by the drive spindle and in which the platform suspension contributes substantially no error to the torque reading.

(8) To provide a machine, as aforesaid, in which all of the parts are readily accessible, in which the spindle and platform supports do not interfere with installation of the specimen and which is arranged for convenient and rapid test set up.

(9) To provide a machine, as aforesaid, which is relatively simple and inexpensive in construction, is sufficiently sturdy as to provide a long service life with minimum maintenance and is readily maintainable by persons of little specialized training with respect thereto.

Other objects and purposes of this invention will be apparent to persons acquainted with apparatus of this general type upon reading the following specification and inspecting the accompanying drawings.

In the drawings:

FIGURE 1 is an oblique view of a machine embodying the invention.

FIGURE 2 is an enlarged fragmentary central cross-sectional view taken substantially on the line II—II of FIGURE 1.

FIGURE 3 is an enlarged sectional view substantially as taken on the line III—III of FIGURE 2 and with the drive ball omitted.

FIGURE 4 is a sectional view taken on the line IV—IV of FIGURE 2.

FIGURE 5 is a central cross-sectional view of a cryogenic test chamber for use with the machine or FIGURE 1.

FIGURE 6 is a central cross-sectional view of a high temperature test chamber for use with the machine of FIGURE 1.

FIGURE 7 is a central cross-sectional view of a pressurizable test chamber for use with the machine of FIGURE 1.

Certain terminology will be used in the following description for convenience in reference only and will not be limiting. The words "upwardly" "downwardly," "rightwardly" and "leftwardly" will designate directions in the drawings to which reference is made. The words "front" and "rear" will refer to the side of the machine normally closest to the farthest from, respectively, the operator, here the left and right sides as seen in FIGURE 2. The words "inwardly" and "outwardly" will refer to directions toward and away from respectively the geometric center of the device and designated parts thereof. Said terminology will include the words above specifically mentioned, derivatives thereof and words of similar import.

*General description*

In general, the objects and purposes of the invention are met by providing a rolling contact test machine for testing a multiball test specimen, which machine includes a rotatably energized drive spindle support in a depending position on the frame of the machine. A platform for supporting a test specimen is disposed below the drive spindle and is urged upwardly thereagainst by a suspension system. The suspension system includes a plurality, preferably three, of pulleys rotatably fixed to the frame above the platform. A flexible cable is supported on each of the pulleys. The cables are connected by upstanding rods to the platform at evenly circumferentially spaced points. Substantially horizontal levers are pivotally supported at one end thereof with respect to the frame below the platform. The remaining end of each cable is affixed to a corresponding lever adjacent the pivot point. The free ends of the levers are provided with removable weights. The levers tension the cables in a multiple of the corresponding weights to urge the platform, and hence the specimen, axially toward the drive spindle. The suspension system allows the cables to center and level the specimen beneath the drive spindle without introducing spurious forces thereon. The spindle is provided with a variable speed drive motor. A strain beam prevents rotation of the platform by torque imposed on the specimen by the spindle and strain gauge means are connected to the beam for measuring such torque. In addition, test chambers are provided to house said test specimen on the platform testing the specimen under a variety of environmental conditions.

*Detailed description*

The machine 10 (FIGURE 1) includes a frame generally indicated at 11. The frame 11 comprises a planar and horizontal table 12 supported on a plurality, here four, of depending legs 13, 14, 16 and 17. An upstanding back panel 18 (FIGURES 1 and 2) divides the table 12 into front and rear portions 21 and 22 respectively. Upstanding braces 23 and 24 extending rearwardly from the back wall 18 and support same with respect to the rear portion 22 of the table 12. A shelf 26 extends forwardly from the top of the back wall 18 nearly to the forward edge of the table 12. Braces 27 and 28 extend between the side edge portions of the shelf 26 and back wall 18 to rigidly support the shelf 26.

The machine 10 includes a drive system 31 (FIGURE 2) which includes a motor 32 and a vertical drive spindle 33 rotatably driven thereby. The drive spindle 33 is rotatably supported in a bearing assembly 34 which is rigidly affixed to the underside of the shelf 26 at a location spaced from the back wall 18. The drive spindle 33 extends downwardly from the bearing assembly 34 to a point between the table 12 and shelf 26.

The bearing assembly 34 may be of any convenient type capable of supporting the drive spindle 33 against relatively large upward axial thrust loads. Moreover, the bearing assembly 34 preferably is capable of preventing axial backlash of the spindle upon cessation of such upward thrust loads thus assuring that the drive spindle 33 will be vertically located in the same precise position at all times substantially regardless of axial load thereon. The bearing assembly 34 must of course be able to support the drive spindle 33 without appreciable radial play at the lower end thereof.

In the particular embodiment shown, bearing assembly 34 includes an outer casing 36 which depends from the shelf 26 and is affixed thereto by any convenient means such as screws, not shown. A bearing cartridge 37 is snugly upwardly insertable into the casing 36 and is retained therewithin by a cap 38 removably affixed to the lower end of the casing 36 by means such as screws, not shown. The cartridge 37 includes a pair of combined axial and radial thrust bearings 41 and 42, here of the ball type, which are preferably pressed on the drive spindle 33. The bearings 41 and 42 are spaced from each other and above a radial shoulder 43 on the spindle 33 by suitable axially extending spacers. An outer shell 44 radially engages the outer races of the bearings 41 and 42 and the inner surface of the casing 36. The outer shell 44 axially engages the upper edge of the lower bearing 42 and the lower edge of the casing 36. Thus, upward axial loading of the spindle 33 is passed by the shoulder 43 through the lower bearing 42, and the lower portions of the outer shell 44 and casing 36 to the shelf 26 thereby precluding upward movement of the spindle 33 in response to such upward loading. An inner shell 46 is snugly but slideably disposed within the outer shell 44. A precompressed helical spring 47 surrounds the spindle 33 and axially engages the shells 46 and 44 to urge said shells axially apart. The upper end of the inner shell 46 is disposed below and in contact with the outer race of the upper bearing 41 and provides a constant upward preloading force on said bearing to prevent downward movement of the spindle 33 upon cessation of upward thrust loads thereupon.

The upper end 48 of the drive spindle 33 extends above the shelf 26. A relatively small drive gear 51 is rigidly affixed to said upper end 48 preferably by the keys 52 and a lock nut 53.

The motor 32 is supported by a bracket 54 of any convenient type on the rearward face of the back wall 18 behind the drive spindle 33. The motor 32 has an output shaft 56 which extends upwardly above the shelf 26. A relatively large drive gear 57 is rigidly affixed to the shaft 56 preferably by a tapered hub 58 and key 59. In the particular embodiment shown, the diameter of the drive gear 57 is 6.67 times the diameter of the drive gear 51 so as to drive the spindle 33 at a multiple of the motor speed. Also in the particular embodiment shown, the motor is of the variable speed, eddy current coupling type capable of delivering constant torque through a speed range of 0 to 1750 r.p.m. corresponding to spindle speeds from 0 to about 11,000 r.p.m., upon manipulation of a suitable motor speed control generally indicated at 61. If desired, any convenient rotational speed indicator, not shown, may be driven by rotating elements of the drive system 31 to indicate the precise speed of the drive spindle 33. A toothed belt 62 positively drives the gear 51 from the gear 57. The toothed belt 62 is preferably covered with a guard 63 (FIGURE 1).

The lower end of the drive spindle 33 is arranged to coaxially receive the tapered shank of a chuck member 66. The chuck member 66 has a downwardly opening, coaxial cylindrical recess 67, the lower edge of which drivingly engages the drive ball of a test specimen hereinafter described. The recess 67 in the chuck 66 is slightly less in diameter than the drive ball 91 tightly gripping same. A diametral opening 68 in the drive spindle adjacent the lower end thereof facilitates removal of the chuck member 66 from the drive spindle.

A platform 71 is supported substantially coaxially with and below the lower end of the drive spindle 33 by a suspension system generally indicated at 72. The platform 71 comprises a circular plate 73 having an upwardly opening central recess 74. The plate 73 is supported on and fixed, by any convenient means such as welding, to a spider 76 having a plurality, preferably three, of preferably similar arms 77, 78 and 79. Said arms extend equal radial distances from the center of the plate 73 and are preferably equally circumferentially spaced with respect thereto.

A dish-shaped specimen adaptor 86 is snugly receivable within the recess 74 and in turn snugly receives the race cup 87 of the specimen 88. The specimen further includes a plurality, here three, of driven balls 89 surmounted by a drive ball 91. If desired, a conventional spacer, not shown, may be employed to separate the driven balls. It is contemplated that the specimen may take any of a number of known forms, having various ball sizes, race diameters, ball spacings, etc. Moreover, it is contemplated that specimens employing other than three driven balls may be used.

The suspension system 72 is arranged to support the platform so that the specimen 88 will be self-leveling and self-centering with respect to the spindle 33. In addition, the suspension system 72 is arranged to provide a constant load force on the specimen by urging the platform upwardly with respect to the drive spindle with a constant force despite variations in the spindle length due to thermal cycling or wear on the spindle bearing or specimen. The particular suspension system 72 illustrated and described is a preferred one.

The suspension system 72 includes preferably identical upstanding rods 81, 82 and 83 which are mounted atop the outer ends of the arms 77, 78 and 79, respectively, by any convenient means such as screws one of which is indicated at 84 (FIGURE 2). The system 72 further includes corresponding rotatable support means comprising pulleys 92, 93 and 94, respectively. The pulleys 92, 93 and 94 are preferably identical and each comprise an inverted U-shaped fork 96 affixed to the underside of the shelf 26 by any convenient means such as screws 97 (FIGURES 1 and 2). A horizontal axle 98 is supported between the legs of the fork 96 and carries a freely rotatable pulley wheel 99. The pulleys 92, 93 and 94 are spaced above the upper ends of the rods 81, 82 and 83, respectively, in a manner that the wheels 99 thereof are on one side each tangent to a line extending upwardly from the corresponding rod. In the particular embodiment shown, the axle 98 of each of the pulleys is substantially parallel to the respective one of the arms 77, 78 and 79.

Elongated flexible elements 102, 103 and 104, in the particular embodiment shown, $\frac{1}{16}$ inch diameter, stainless steel cables, are affixed at one end thereof by quick release connectors 101 of any convenient type to the upper end of the rods 81, 82 and 83, respectively. The cables 102, 103 and 104 extend upwardly around the wheels 99 of the respective pulleys 92, 93 and 94, and then extend downwardly therefrom loosely through openings 106 (FIGURES 1 and 3) in the table 12. Each cable preferably includes an additional quick release connector 105 between said pulleys and table.

The suspension system 72 further includes preferably identical lever devices 112, 113 and 114 (FIGURES 2 and 4) for tensioning the cables 102, 103 and 104, respectively, by downwardly pulling the ends thereof located below the table 12. The lever devices, for example, the device 112, includes a pivot bracket 116 which is fixed to and depends from the table 12 at a point spaced slightly forwardly from the corresponding cable opening 106. A lever arm 117 is pivotally affixed at its forward end to the bracket 116 and extends rearwardly from the bracket 116 for pivotal motion in a vertical plane. A limit bolt 118 threadably engages and depends from the table 12 near the rearward end of the lever arm 117 and is loosely disposed in a hole therein for limiting downward movement of said rearward end beyond a predetermined point but allowing free pivotal movement of the lever arm 117 above that point. The lower end of the cable 102 is affixed to the lever arm 117 at a predetermined location thereon adjacent the bracket 116 by any convenient means here including a threaded adaptor and nut assembly 119. A mass unit 120 is associated with each lever arm 117 and includes a weight pan 121. The weight pan 121 has an upstanding central stem 122 which at its upper end is pivotally affixed with respect to the rearward end of the lever arm 117. The pan 121 is arranged to accept weights generally indicated at 123 in a conventional manner which, because of gravitational force, urge the rearward end of the lever arm 117 downwardly. The lever device 112 thus produces a downward force on the cable 102 which is a multiple of the weight of the mass unit 120 comprising the afore-mentioned pan, stem and weight. In the particular embodiment shown, the distance from the pivot point to the cable attachment is ten percent of that between the pivot point and the weight attachment. Thus, by adding weights 123 of a known weight to the mass unit 120 of each of the lever devices 112, 113 and 114, a predetermined upward force may be exerted on the platform and, hence, upon the specimen supported thereby.

An upstanding strain beam 126 is fixed to a suitable adaptor block 127 mounted upon the table 12. A pin 125 or the like is affixed to the strain beam near its upper end and protrudes therefrom in unpending engagement with the arm 77 near the outer end thereof. Thus, the platform may move vertically through a small range with respect to the strain beam, the pin 125 sliding along the face of the arm 77, without changing the bending movement applied to the strain beam in response to torque applied to the platform. The strain beam 126 thus blocks rotary movement of the platform 71 resulting from torque imposed thereupon by rotation of the spindle 33. The block 127 preferably is arranged by shimming or telescoping in a conventional manner, to allow the platform to be set at more than one height. A strain sensor 128 of any conventional type may be affixed, as by cementing, to the strain beam 128 above the block 127. The strain sensor 128 may then be connected to any convenient read-out device 129 in a known manner for furnishing a visual indication of the torque imposed on the specimen. Since the strain beam 128 is, in accordance with modern strain measuring practice, relatively stiff in comparison with the relatively flexible cables 102, 103 and 104, the very small rotational deflection required of the platform to actuate the strain sensor prevents said cables from introducing significant error into such torque measurement. With the apparatus shown it has been found that specimen friction torque as low as .25 oz.-inch can be measured with accuracy and repeatability within 5%.

*Operation*

Although the operation of the machine 10 has been substantially described hereinabove, such operation will hereinafter be summarized to assure a complete understanding of the invention. The machine 10 may be loaded with the specimen in the following manner. Normally when the machine 10 is to be loaded with a new test specimen, the weight pans 121 will be emptied of weights 123. The limit bolts 118 are preferably normally adjusted to prevent the levers 117 from moving the platform plate 73 or adaptor 86 upwardly into contact with the chuck 66 of the drive spindle 33. Thereafter, the platform may be manually pressed downwardly and, if desired, sidewardly to allow mounting of the specimen thereon.

Although the platform 71 may thus be loaded while connected to the suspension system substantially as shown in the drawings, it is often preferable to remove same from the suspension system by releasing the quick release connectors 101 and transfer same to a convenient loading location such as the front portion 21 of the table 12. The specimen 88, including the race cup 87 and balls 89 and 91, is inserted into the concave upper surface of the adaptor 86 which is then snugly inserted into the central recess 74 in the plate 73, frictional forces between the race cup, adaptor and plate normally being sufficient to prevent rotation therebetween during testing. Thereafter, the platform 71 may be returned to the machine 10 and reinstalled moving the platform upwardly toward the chuck 66 to seat the drive ball 91 in the recess 67 thereof and then connecting the cables to their respective rods by means of the connectors 101. Weights 123 of the desired magnitude may then be added to the pans 121 in order to press the specimen 88 against the drive spindle 33 with the desired loading force.

The use of a substantial length of cable between the pulleys 92, 93 and 94 and the platform 71, with or without the rods 81, 82 and 83, causes the platform to be self-centering with respect to the spindle 33. More particularly, if the platform 71 is pushed away from its centered position and then released, it will swing back toward and eventually return to its centered position beneath the spindle 33. Moreover, should the race cup 87 be located, as by inadvertence, somewhat eccentrically on the platform 71 so that the race cup is located eccentrically of the drive spindle 33, the platform 71 will easily swing on the cables to a position for centering the race cup below the drive spindle without introducing significant sideward forces on the balls of the test specimen. Thus, the use of the cables in the suspension of the platform 71 allows the driven balls 89 and race cup 87 of the specimen to center on the drive spindle easily in response to contact with the drive ball 91.

The strain beam is normally arranged for abutting the corresponding arm 77 to prevent gross rotation of the platform by torque exerted on the specimen by the spindle when it is rotated and to furnish, through the sensor 128 and read-out device 129, an indication of such torque. Finally, the motor 32 may be energized by the control 61 to rotate the spindle 33 at the desired speed. Since the platform 71 is capable of some vertical sliding movement along with the pin 125 on the strain beam 126, variations in the length of the load path elements due to temperature changes or wear do not change the load applied to the specimen by the machine since the platform will move vertically to maintain the load constant. Moreover, since the load forces are furnished by weights rather than springs or other means subject to force variation due to fatigue, leakage, etc., the load force can be maintained or reset at a desired value with great precision over long periods of time and from test to test.

Particular note should be taken of the rods 81, 82 and 83. The rods 81, 82 and 83 are included primarily to cause the platform 71 to be self-leveling. If such rods were omitted and the cables 102, 103 and 104 were attached directly to the arms of the platform 71, the cables would pull directly upwardly if the platform was level and would have only slight restoring angles if the platform was tilted. Inclusion of the high rising rods 81, 82 and 83 provides an essentially rigid upward extension of the platform well above the pivot point of such tilting, such pivot point being the center of the drive ball 91. If the platform is then tilted, the upper ends of the rods 81, 82 and 83 are substantially horizontally displaced from their normal positions which results in substantially increased cable restoring angles, and hence, restoring forces. As a result, significant restoring moments occur at much smaller tilt angles than would be the case if the rods 81, 82 and 83 were omitted from the suspension systems. The ability to maintain the platform horizontal is thus a direct function of the height of the rods 81, 82 and 83.

Under certain circumstances it may be desired to omit the rigid rods 81, 82 and 83 and connect the ends of the cables directly to the arms of the platform 71. An example of such a circumstance would be when it is desirable to let the interaction of the drive and driven balls 91 and 89 of the test specimen determine the slope or lack of slope of the platform. It is contemplated also that at least within the broader aspects of the invention, that the rods 81, 82 and 83 may be omitted from the connection of the cables to the platform 71 and that, as a result, leveling of the platform may be left to other means.

*Modifications*

Although a wide variety of tests may be made in the atmosphere and at room temperature with the apparatus as above described, it is contemplated that the above-described apparatus may be used for testing bearing materials or lubricants under different environmental conditions with or without the use of lubricants or other fluids. To make possible such testing, the appropriate one of several specialized chambers hereinafter described may be employed for containing the specimen under the desired conditions.

FIGURE 5 discloses a cryogenic test chamber 131 having a pilot 132 extending from the bottom thereof for reception into the central recess 74a of the platform plate 73a similar to the plate 73 of FIGURE 1.

The cryogenic chamber 131 has a double-walled base 133 which is substantially cup-shaped and provides an upwardly opening cavity 134. The chamber 131 is provided with a double walled cover 136 to close the upper end of the cavity 134. In the particular embodiment shown, the base and cover are provided with annular flanges 137 and 138, respectively, held together by nuts vacuum pump, whereby to allow evacuation of the zones 143 and 144 within the base 133 and cover 136, respectively. A vacuum port 146 is provided in the base 133 for connection to a suitable vacuum source V, such as a vacuum pump, thereby to allow evacuation of the zones 143 and 144. O-ring seals 147 and 148 are disposed between the flanges 137 and 138 with the holes 142 therebetween to prevent communication between the cavity 134, the evacuated zones 143 and 144 and the atmosphere. An upwardly opening recess 149 is provided in the bottom of the cavity 134 for receiving the race cup 87a of the specimen 88a.

A drive spindle 33a passes downwardly through a central opening 151 in the cover 136 and has a chuck member 66a for engaging the drive ball 91a of the specimen 88a. The opening 151 includes a labyrinth seal 152 in the lower portion thereof and a cryogenic seal 153 of any convenient type located thereabove and engaging a shoulder on the spindle 33a for preventing leakage of cryogenic fluid outwardly from the recess chamber 134 and past the spindle 33a. A seal pressure drain tube 154 extends from the area above the labyrinth seal 152 radially outwardly of the cover 136. A filling tube 156 passes through the cover 136 into the cavity 134 for supplying cryogenic fluid of any desired type thereto. Thus, the cryogenic test chamber 131 provides a means for testing rolling contact bearing material in a wide variety of cryogenic fluids and temperatures without alteration to the machine 10, particularly where said machine is initially provided with a drive spindle having the configuration of the spindle 33a, and as a replacement for the adaptor 86 of the machine of FIGURE 1.

FIGURE 6 illustrates a high temperature chamber 161 comprising a generally cup-shaped base 162 having an upwardly opening cavity 163. The chamber 161 is provided with a cover 164 having a downwardly extending annular sealing flange 166. The base 162 and cover 164 are preferably insulated and, in the particular embodiment shown, comprise high temperature insulative material enclosed between double walls of 1/16 inch thick stainless steel sheeting. The base 162 is provided with a depending pilot 167, the bottom end of which is normally receivable in the pilot recess 74 of the table 71 of the machine of FIGURE 2. The pilot 167 is elongated and includes a downwardly facing recess 170 in order to provide a reduced cross-sectional area and, hence, reduce heat flow between the chamber 161 and the platform 71. If desired, an insulative spacer indicated in broken lines at 168 may be placed between the bottom of the base 162 and the platform 71. An adaptor 169 is snugly received in an upwardly opening central recess 171 in the bottom of the cavity 163. The adaptor 169 has an upwardly extending cylindrical wall 172. The race cup 87b of a specimen 88b is received on an upwardly facing recess in the bottom of the adaptor. The spindle 33b extends downwardly through a snug opening 176 in the cover 164 and into the adaptor 171 for engaging the specimen 88b. A heating element 177, here an electrical resistance element, is loosely coiled around the wall 172 of the adaptor 169 and has ends which extend upwardly and outwardly through the cover 164 for connection to any convenient source of power P. Lubricants or other fluids of any particular kind may be inserted in the adaptor 169 for testing. The temperature chamber 161 has been used for conducting rolling ball tests at temperatures in excess of 1000° F. Moreover, it is contemplated that substantially higher temperatures may be reached depending on the material employed for construction of the chamber and spindle.

The relatively thick bottom wall of the base 162 including the spacer 168 increases the spacing between the test specimen and the platform over that shown in FIGURES 1 or 5. This can be compensated for in any of several ways including an effective lengthening of the cables by any convenient means. For example, the portion of each cable between the quick release connectors 101 and 105 may be replaced with a corresponding portion of increased length to, thereby, in effect lengthen the cables when it is required that the spacing between the end of the spindle 33 and the platform 71 be increased. On the other hand, it is contemplated that the spindle 33 might be replaced with a shorter one.

FIGURE 7 discloses a fuel and oxidizer chamber 181 which enables testing of specimens at atmospheric or higher pressures in various fluids such as storable propellants including fuels and oxidizers or a wide variety of other fluids. The pressure fluid chamber 181 comprises a cup-shaped base 182 having an upwardly opening central cavity 183. A cover 184 is tightly affixable atop the base 182 to cover the cavity 183 by any convenient releasable means such as nuts 185 and bolts 186 and an O-ring seal 187 disposed between the cover and base prevents leakage of fluid out of the cavity 183. A central recess 188 is provided in the bottom wall of the base 182 for receiving a test specimen in the manner above discussed with respect to FIGURES 5 and 6. A passage 189 extends radially outwardly from the recess 188 for receiving a thermocouple or similar heat sensing element for detecting the temperature near or within the test specimen. Fluid circulation ports 191 and 192 are provided in the upper portion of the base 182 and in the bottom wall of the base below the recess 188 for circulating fluid of any desired type past and through the balls of the specimen. The cover 184 includes an elongated central opening 193 coaxial with the recess 188 for snug reception therethrough of a drive spindle such as the drive spindle 33 illustrated hereinabove with respect to FIGURE 1. An annular groove 194 is provided near the middle of the opening 193 and is vented by suitable radial ports 196 to allow escape of overflow fluid from the cavity 183. A further, annular groove 197 is located adjacent and above the groove 194 and communicates through the wall of the cover 184 by means of a port 198 with a source, not shown, of back pressure fluid of any convenient type. Labyrinth seals 201 and 202 are provided above and below the grooves 194 and 197 for snugly surrounding the drive spindle. The back pressure fluid flowing through the groove 197, downwardly along the spindle, through the groove 194 and then out the opening 196 pressurizes the upper end of the seal 202 to prevent fluid from escaping the cavity 183 therepast. The labyrinth seals 201 tend to prevent the escape of back pressure fluid outwardly and upwardly along the spindle. Hence, the effects of fluids at normal or elevated pressures on the loaded specimen may be observed.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. In a rolling contact test machine for testing a multi-ball test specimen, the combination comprising:
   a frame;
   a drive spindle rotatably supported on said frame for drivingly engaging said specimen and means for rotating said spindle;
   a plurality of rotatable support means disposed on said frame;
   a plurality of flexible elements supported by said rotatable support means, each of said flexible elements having at least one end depending from said rotatable support means;
   a specimen platform for supporting said specimen and means connecting same to said one ends of said flexible elements for suspending said specimen platform adjacent said drive spindle;
   weight means cooperating with each of said rotatable support means for urging said specimen on said platform into driven engagement with said drive spindle.

2. The machine defined in claim 1 wherein said weight means each include a mass and lever means connected to said mass, said lever means being supported for rotation about an axis fixed with respect to said frame for tensioning the corresponding one of said elements with a force related to the weight of said mass.

3. The machine defined in claim 1 in which said means for rotating said spindle comprises a variable speed motor and positive drive connecting said motor to said spindle.

4. The device defined in claim 1 including a bearing assembly fixed with respect to said frame and rotatably supporting said spindle, said bearing assembly including spring means loading said spindle againt axial movement toward said specimen.

5. The machine defined in claim 1 including an upstanding strain beam, and means for fixing same to said frame at one end thereof, the other end of said strain beam engaging said specimen platform to prevent rotation thereof by torque exerted on said specimen and strain sensing means applied to said strain beam for detecting strain therein due to said torque.

6. In a rolling contact test machine for testing a multiball test specimen, comprising a combination:
   a frame;
   a rotatably driveable spindle pendently supported on said frame and having a lower end for engaging and rotating one ball of said specimen and a specimen platform for supporting said specimen below said spindle;
   a platform suspension system for supporting said specimen platform and urging said specimen coaxially against the lower end of said drive spindle with a predetermined force;
   at least three pulleys affixed to said frame and spaced above said specimen platform;
   an elongated flexible element passing over each of said pulleys, each of said flexible elements having a first end and a second end depending from said pulley;
   means for connecting said first ends to points on said platform radially spaced from said test specimen and equally circumferentially spaced with respect thereto;
   at least three levers, each of said levers being affixed to a corresponding one of said second ends;
   means for pivotally supporting each of said levers on said frame at a point spaced in one direction from the corresponding one of said second ends;
   a weight affixed to each of said levers at a point spaced in the opposite direction from said second ends;
   whereby said weights urge said levers downwardly to tension said flexible elements and thereby cause said specimen to be forceably urged against the lower end of said spindle.

7. The machine defined in claim 6 in which the portions of said flexible elements depending from said pulleys are substantially parallel, said means connecting said first ends to said platform comprise upstanding rods rigidly fixed to the platform and quick release connectors disposed between said rods and said first ends.

8. The machine defined in claim 6 in which said frame comprises a substantially horizontal table, a shelf and means spacing said shelf above said table, said spindle extending downwardly from said shelf to a point spaced above said table, said platform being spaced above said table and located below said spindle, said pulleys being affixed to the underside of said shelf, said second ends of said flexible elements passing downwardly through holes in said table and said levers being mounted on the underside of said table, said levers being parallel and extending rearwardly from the pivot points thereof.

9. The machine defined in claim 1 including chamber means supported upon said platform for enclosing said specimen and means allowing entry of said drive spindle into said chamber means for drivingly engaging said specimen.

10. For a rolling contact test machine for testing a multiball test specimen including a rotatably driven drive spindle and a platform axially alignable with and capable of being urged toward the drive spindle, a cryogenic test chamber, comprising in combination:
    a substantially cup-shaped base defining an upwardly opening cavity and means for locating said base centrally of said platform;
    a cover implaceable upon said base to cover the open end of said cavity and means for rigidly affixing said cover to said base, said cover and base being double walled and having hollow zones therewithin;
    means allowing communication between the hollow zones of said cover and base;
    means for evacuating said zones;
    a central opening in said cover and seal means associated therewith for rotatably receiving said spindle therethrough while preventing escape of material from said chamber;
    means communicating with said cavity for admitting cryogenic fluid therethrough;
    means for locating a test specimen centrally within said cavity for being drivingly engaged by said spindle.

11. For a rolling contact test machine for testing a multiball test specimen including a rotatably driven drive spindle and a platform axially alignable with and capable of being urged toward the drive spindle, a high temperature test chamber, comprising in combination:
    a cup-shaped base having an upwardly opening cavity and a cover fixable to said base for closing said cavity, said base and cover each being at least partially comprised of insulating material;
    means on said base for locating same coaxially on said platform;
    an upwardly opening cup-shaped adaptor for receiving a test specimen therewithin located within said cavity and supported centrally on said base having walls extending upwardly toward and spaced from said cover, said adaptor being arranged for containing a fluid therewithin;
    an opening in said cover for snugly but rotatably receiving said spindle therethrough for allowing driving connection of said spindle with said specimen;
    heating means located within said cavity but outside said adaptor and means for connecting said heating element to a source of power.

12. For a rolling contact test machine for testing a multiball test specimen including a rotatably driven drive spindle and a platform axially alignable with and capable of being urged toward the drive spindle, a pressure chamber, comprising in combination:
    a substantially cup-shaped base having an upwardly opening cavity and means for centrally locating said base on said platform;
    a cover removably affixed to said base in sealing engagement therewith for covering the open end of said cavity;
    a centrally located recess in said base communicating at its upper end with said cavity for receiving said specimen therewithin;
    passages in said base communicating with said cavity and with said recess for passing a test fluid through said chamber and past said specimen;
    means for allowing the temperature adjacent said specimen to be detected;
    an elongated central opening in said cover coaxial with said recess for snugly but rotatably receiving said spindle therethrough;
    seal means adjacent the ends of said opening;
    means intermediate the ends of said opening for furnishing a back pressure on the inner one of said seal means for preventing escape of fluid from said cavity.

13. In a rolling contact test machine for testing a multiball test specimen, the combination comprising:
    a rotatable drive spindle for engaging said specimen;
    a specimen platform for supporting said specimen;

a plurality of flexible elements and means connecting same to said platform at spaced points around said specimen for supporting said platform in axially self-aligning relation with said spindle;

loading means operatively associated with said flexible means for causing same to urge said specimen into aligned driving engagement with said drive spindle.

14. The device defined in claim 13, in which said connecting means includes rigid means extending from the specimen supporting portion of said platform radially and axially of said platform for allowing movement of said platform transversely of said spindle while controlling angular movement of said platform.

References Cited

UNITED STATES PATENTS

| 1,176,291 | 3/1916 | Hebert et al. | 73—10 XR |
| 2,370,606 | 2/1945 | Morgan et al. | 73—10 |
| 3,045,471 | 7/1962 | Chapman et al. | 73—10 |
| 3,113,449 | 12/1963 | Morgan | 73—10 |

DAVID SCHONBERG, *Primary Examiner.*

L. R. PRINCE, *Examiner.*

J. NOLTON, *Assistant Examiner.*